US006880771B2

(12) United States Patent
Deppermann

(10) Patent No.: US 6,880,771 B2
(45) Date of Patent: Apr. 19, 2005

(54) AXIALLY RECIPROCATING TUBULAR BALL MILL GRINDING DEVICE AND METHOD

(75) Inventor: Kevin L. Deppermann, St. Charles, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 10/062,753

(22) Filed: Feb. 1, 2002

(65) Prior Publication Data

US 2003/0146313 A1 Aug. 7, 2003

(51) Int. Cl.[7] ............................................ A47J 19/06
(52) U.S. Cl. ............................ 241/2; 241/30; 241/175; 241/176
(58) Field of Search ............................ 241/30.2, 176, 241/177, 178, 175, 171, 172, 179, 184

(56) References Cited

U.S. PATENT DOCUMENTS 2,760,729 A 8/1956 Mittfag et al.
3,643,384 A 2/1972 Isaacson et al. .............. 51/163
3,949,942 A 4/1976 Haas et al. ................. 241/179
3,971,515 A 7/1976 Haas et al. ................. 241/175
4,050,897 A * 9/1977 Klein ......................... 422/205
4,402,909 A * 9/1983 Solazzi ........................ 422/50
4,511,254 A 4/1985 North et al. ................ 366/118
4,561,598 A 12/1985 Musschoot ................... 241/19
4,917,312 A * 4/1990 Bogdanov et al. ............ 241/72
5,029,760 A * 7/1991 Gamblin ...................... 241/65
5,246,173 A 9/1993 Steidl .......................... 241/30
5,702,060 A * 12/1997 Matteazzi et al. .......... 241/175
5,921,477 A * 7/1999 Tomes et al. .................. 241/2

FOREIGN PATENT DOCUMENTS

DE 35 00 211 A1 7/1986
EP 0 353 365 A2 2/1990
FR 2 804 047 A1 7/2001
GB 1114807 A1 5/1968

OTHER PUBLICATIONS

International Search Report, PCT/US03/02731, dated Sep. 22, 2003.

van den Berg, et al., "The terminator, an apparatus for simultaneous homogenization of 96 small seeds individually", *Electrophoresis* 1992, 13, pp. 880–881.

van den Berg, et al., "Equipment for rapid homogenization of high numbers of plant tissue for electrophoretic analysis of proteins", *Electrophoresis* 1992, 13, pp. 76–81.

* cited by examiner

*Primary Examiner*—Mark Rosenbaum
(74) *Attorney, Agent, or Firm*—Joseph A. Schaper; Harness, Dickey & Pierce, P.L.C.

(57) ABSTRACT

A tubular vessel is loaded with a combination of grinding media and a material to be ground. The vessel is capped to contain the grinding media and material therein. Grinding of the contained material is effectuated by reciprocating the capped vessel in a direction parallel to its longitudinal axis. The grinding media may comprise either a ball or a slug, and may further utilizing a plurality of balls, perhaps of different sizes. To increase volume, a plurality of vessels may be gathered together into a sample holder. The sample holder is them reciprocated in a direction parallel to the axes of the included vessels.

28 Claims, 6 Drawing Sheets

AXIALLY RECIPROCATING TUBULAR BALL MILL GRINDING DEVICE AND METHOD

BACKGROUND OF THE INVENTION

1. Technical Field of the Invention

The present invention relates to ball mill grinding devices and methods, in general, and, in particular, to batch ball mill grinding devices and methods.

2. Description of Related Art

Ball mills are well known in the art and are commonly used in laboratories and in industry for the purpose of rapidly and without loss grinding and mixing materials.

One known type of ball mill is commonly referred to as a centrifugal mill. A material to be ground, together with balls of another, hard material, are inserted into a cylindrical vessel. This vessel is then revolved about its axis (or perhaps an axis offset therefrom) at a predetermined speed of rotation to cause movement of the balls within the material. The action of the accelerating forces of the moving balls resulting from vessel rotation causes grinding or mixing of the material. It is important with centrifugal ball mills to carefully control the velocity of rotation because, for each material to be ground or mixed in a given diameter vessel, there exists a limiting value of the rate of rotation beyond which the balls will remain stationary against the inside wall of the vessel and fail to effectuate any grinding action.

By orientating the axis of rotation horizontally, gravitational forces may be used in addition to rotational forces to cause cascading ball movement resulting in an improvement to the grinding or mixing effect. These horizontally oriented centrifugal ball mills are also known as tumbling mills. In this configuration, the material is ground or mixed as a result of compressive collapse and frictional abrasion due to gravitational drop of the cascading balls.

To counter agglomeration effects within the vessel and enhance the homogenization of the material, the direction of rotation for the vessel in a centrifugal ball mill may be reversed.

Another known type of ball mill is commonly referred to as a planetary ball mill. A plurality of mill pots receive a material to be ground together with balls of another, hard material. Each mill pot is mounted to an independently rotatable platform. The plurality of pots are evenly disposed around a main axis of rotation. As the plurality of pots are rotated about the main axis in one direction, each of the individual pots independently rotates about its own axis in an opposite direction. This "planetary" action causes centrifugal forces to alternately add and subtract. Interaction with the material occurs as the balls within each pot roll halfway around the pot and are then thrown across the pot. The synergistic effect between centrifugal forces due to revolution and rotation, combined with the Coriolis force, results in improved grinding/mixing in comparison to centrifugal ball mills.

The need for high volume and quick grinding and sample preparation is well recognized in connection with the primary chemical analysis of many materials, for example, seeds and plant tissues. This chemical analysis is typically performed in connection with the screening of seeds and plant tissues for certain desirable traits. Given the number of seeds and plant tissues a scientist or breeder must screen, and the limited amount of time available for completing such screenings, it is important that seeds and plant tissues be quickly ground to speed the overall analysis operation to identify and select seeds and plants of interest. It is also vitally important to maintain sample isolation and thus ensure that the ground seed or tissue for one sample does not contaminate another sample. Known and readily available ball mill devices do not possess the ability to quickly grind seeds and tissues in the volumes, and with the requisite isolation, needed by scientists and breeders.

SUMMARY OF THE INVENTION

The present invention is a ball mill that utilizes a tubular vessel to contain grinding media and a material to be ground. The tubular vessel has a longitudinal axis. A drive mechanism operates to induce a linear reciprocating movement of the tubular vessel substantially in the direction of the longitudinal axis. Movement of the grinding media back and forth within the vessel as a result of the induced linear reciprocating movement effectuates a grinding of the contained material.

A method for ball mill grinding in accordance with the present invention first loads the vessel with the grinding media and the material to be ground. The vessel is then capped to contain the grinding media and material. Grinding of the material is then effectuated by reciprocating the capped vessel in a direction substantially parallel to its longitudinal axis.

The grinding media may comprise a single ball or slug contained with the vessel. In an alternative embodiment, the grinding media may utilize a plurality of balls, which may be of differing sizes.

Multiple vessels may be loaded and simultaneously reciprocated substantially in the direction of their parallel axes to increase the volume of material to be ground by the ball mill.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
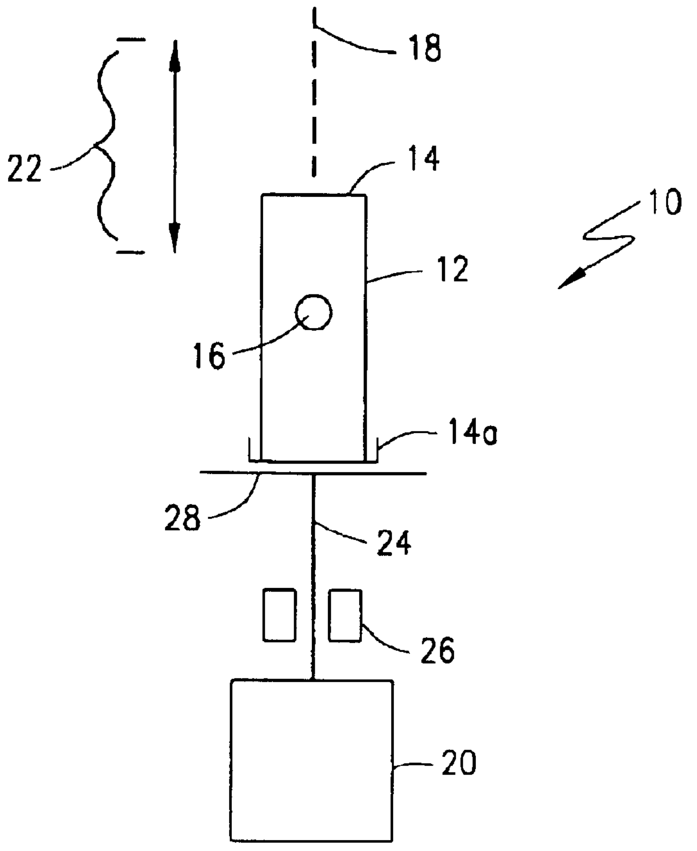
FIG. 1 is a schematic drawing of an embodiment of an axially reciprocating tubular ball mill in accordance with the present invention.
Figure 2:
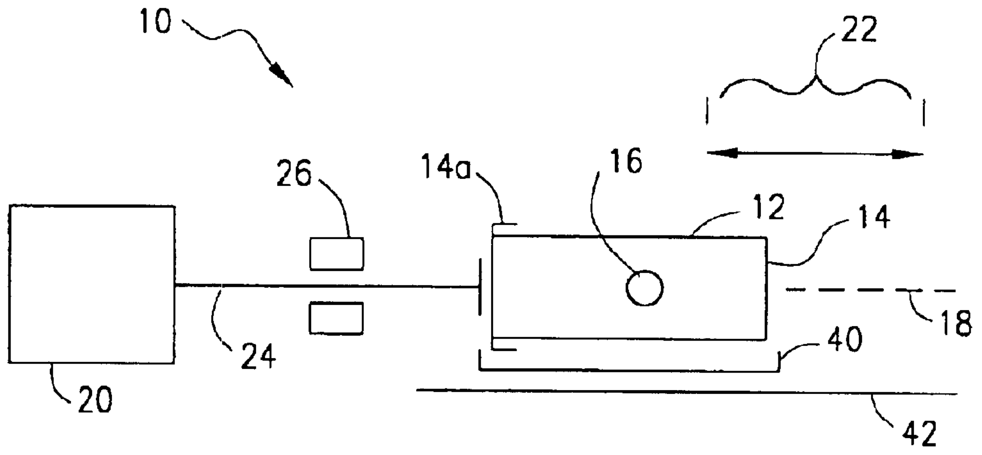
FIG. 2 is a schematic drawing of another embodiment of an axially reciprocating tubular ball mill in accordance with the present invention.
Figure 3:
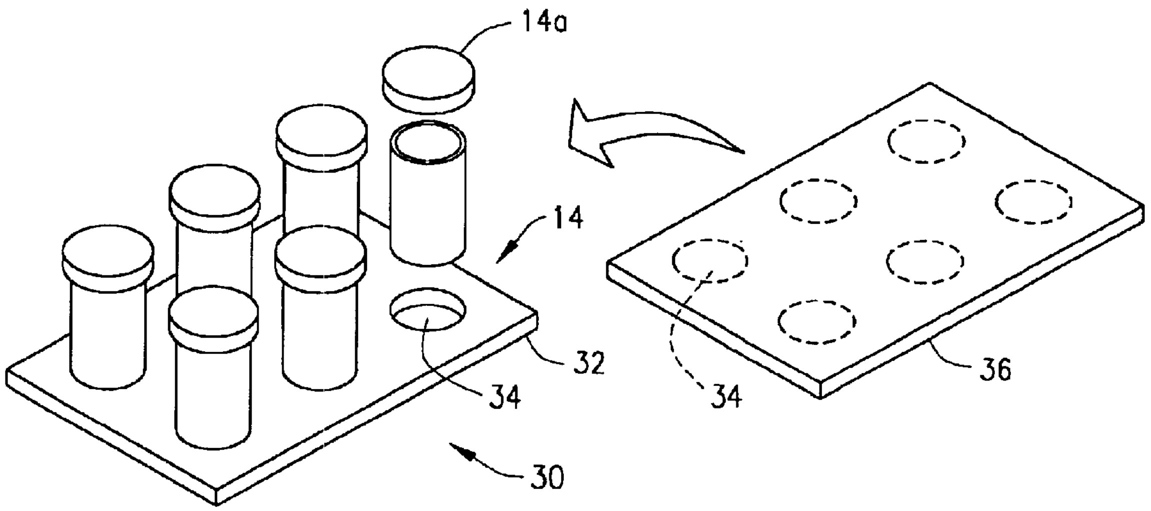
FIG. 3 is an orthogonal view of a sample holder including plural vessels.
Figure 4:
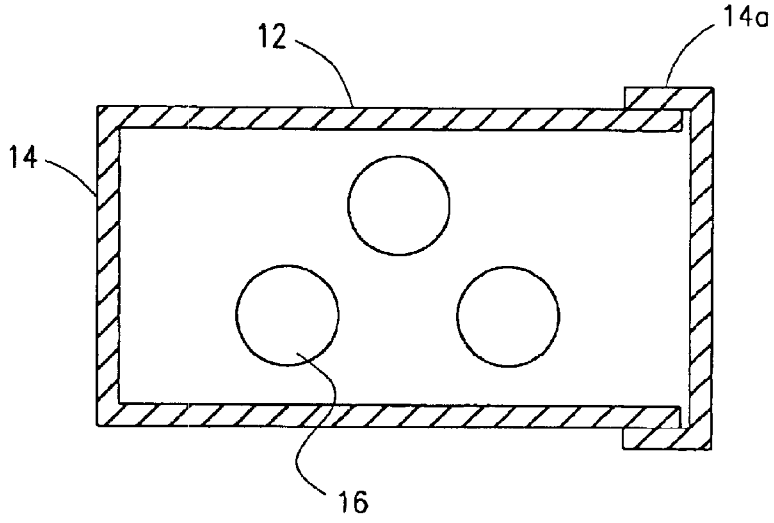
FIG. 4 is a schematic cross-sectional view of a capped vessel showing the use of multiple balls for the grinding media.

Reference is now made to FIGS. 1 and 2 wherein there are shown schematic drawings of embodiments of an axially reciprocating tubular ball mill 10 in accordance with the present invention. The ball mill 10 includes at least one tubular (for example, cylindrical) vessel 12, wherein each included vessel is capped 14 at each end. The tubular vessel 12 may have a cross-section that is of any selected hollow shape including: a circle; square; rectangle; polygon; oval; ellipse; and the like. At least one of the caps 14*a* is removable to allow for access to the interior of the vessel 12. FIG. 1 specifically illustrates the use of a single capped vessel 12, but more than one vessel may be used as the grinding container, if desired, as shown in FIG. 3. Deposited within each capped vessel 12, using the removable cap 14*a*, is a material to be ground or mixed along with grinding media 16 which may comprise at least one ball, cylinder, slug, or the like. FIG. 1 specifically illustrates the use of a single ball for the grinding media 16, but more than one ball (of the same size or of differing sizes) may used as the grinding media, if desired, as shown in FIG. 4. The capped vessel 12 has an axis 18 passing longitudinally therethrough and about which the interior is defined. The ball mill 10 further includes a drive mechanism 20 for causing the capped vessel 12 to be reciprocated back and forth substantially along the longitudinal axis 18 in the direction of the illustrated double-ended arrow. Any suitable reciprocating drive mechanism known in the art may be used provided it produces sufficient stroke and reciprocation rate and further possesses sufficient horsepower to drive the load. The stroke distance 22 for the drive mechanism's 20 reciprocation preferably equals or exceeds one inch, and is more preferably greater than an inch along the longitudinal axis 18. The rate of reciprocation is preferably in the range of 1000 to 2000 cycles per minute (when loaded).

It will be recognized that a directional axis (defined by the arrow) along which the drive mechanism induces reciprocation is substantially parallel with the longitudinal axis 18 (and in the case of a single vessel the axes may be substantially aligned therewith). With each reciprocation, the grinding media (for example, ball 16 or balls) contained therein move back and forth causing an interaction between the media, the material to be ground and the interior surface of the vessel 12 and caps 14. The action of the accelerating forces of the moving grinding media 16 that results from vessel 12 reciprocation causes a grinding or mixing of the contained material within the vessel in a very short period of time and with a very fine granularity. The reciprocating action further serves to counter material agglomeration effects within the vessel 12.

The vessel 12 is oriented vertically in one preferred implementation as shown in FIG. 1. Connected to the vessel 12, either directly or through a vessel support platform 28, is a drive rod 24 with a corresponding vertical orientation. The drive rod 24 passes through a bearing 26 that serves to both maintain the vessel's vertical orientation and allow for substantially friction-less movement of the drive rod in reciprocally actuating the axial movement of the vessel 12. Although a vertical orientation with the vessel located above the drive mechanism is shown, it will be understood that a vertical orientation with the vessel suspended below the drive mechanism may be used as well.

The vessel 12 is oriented horizontally in another preferred implementation as shown in FIG. 2. A corresponding horizontally oriented drive rod 24 is connected to the vessel, either directly or through a vessel support carriage 40, to transfer reciprocal actuation to the vessel from the drive mechanism 20. The bearing 26 assists in supporting the horizontal orientation of the drive rod 24 and allows for substantially friction-less movement of the drive rod in reciprocally actuating the axial movement of the vessel 12.

The carriage 40 supports and holds the capped vessel 12, and is moveable over a transfer surface 42. Any suitable configuration for low friction carriage/transfer surface construction may be implemented, including, for example, a rolling configuration or a sliding configuration.

Reference is now made to FIG. 3 wherein there is shown an orthogonal view of a sample holder 30 including plural vessels 12. The sample holder 30 includes a base plate 32 having a plurality of generally tubular recesses 34 sized and shaped to be very slightly larger than the size and shape of the tubular vessel 12. These recesses 34 may be obtained by forming, molding, machining, and the like, actions taken on the plate 32. When the vessels 12 are inserted (for example, by press-fitting) into the recesses 34, the base plate 32 forms a first cap 14 at one end of each vessel and acts as a support holder for the vessels. As an alternative, each vessel may be open at only a single end and thus include an integral first cap 14. In this configuration, the base plate acts as a support holder for the plurality of vessels. At the opposite end of each vessel 12 is provided a removable cap 14*a* that is sized and shaped to conform substantially to the size and shape of the vessel and to enclose the vessel when used. A top plate 36 sized and configured with corresponding recesses 34 (shown in phantom) to the caps 14*a* supports and holds the plurality of capped vessels. As an alternative, the top plate 36 may be used in place of the individual caps 14*a* to close the end of the vessels 12, in which case, the plate 36 will include recessess 34 sized and shaped to be very slightly larger than the size and shape of the tubular vessel 12. Disassembly of the sample holder 30 is easily accomplished into the constituent parts (plates 32/34, vessels 12 and caps 14/14*a* (if used)) to allow for part cleaning, repair or replacement.

Reference is now made to FIGS. 5A–5D wherein there are shown detailed, partially exploded cross-sectional views for various embodiments of the FIG. 3 sample holder 30 and components thereof. These FIGURES illustrate a preferred embodiment of a cylindrically shaped vessel 12. As mentioned above, however, it will be understood that the vessels may have a cross-sectional shape other than a circle if desired by a given grinding or mixing application.

Figure 5A:
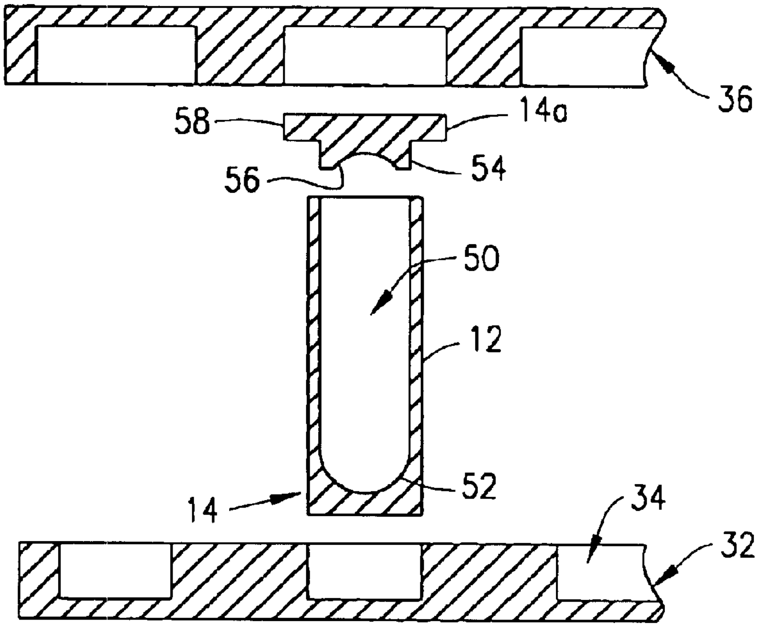
FIGS. 5A–5D show detailed, partially exploded cross-sectional views for various embodiments of the FIG. 3 sample holder and components thereof.

Turning first to FIG. 5A, the base plate 32 is shown in cross-section to include a plurality of cylindrical recesses 34. The vessel 12 comprises a cylinder having an outer diameter equal to or very slightly smaller than the diameter of the cylindrical recess 34. This allows the vessel 12 to be press-fit and held within the recess 34. The vessel 12 includes an axial bore 50 extending from one end and terminating in a substantially spherical surface 52 (preferably fully hemispherical) before reaching an opposite end. The surface 52 defines an integral cap 14 at the opposite end of the vessel 12. The bore 50 has a diameter slightly larger than the diameter of a largest size ball (not shown) to be retained therein. The spherical surface 52 is defined by a radius that correspondingly also slightly exceeds the radius of that same largest size ball. As an example, for a 0.750 inch diameter ball used as the grinding media, the vessel bore may have a diameter of 1.000 inches and the spherical surface a radius of 0.500 inches. The cap 14*a* includes a cylindrical insert portion 54 having an outer diameter equal to or very slightly smaller than the inner diameter of the axial bore 50. This allows the insert portion 54 of the cap 14*a* to be press-fit and held within the vessel 12. The insert portion 54 further includes a spherical recess 56 (not necessarily fully hemispherical) whose radius substantially equals the radius of the spherical surface 52 within the vessel 12. The cap 14*a* further includes a knurled edge 58 having a diameter that preferably exceeds the outer diameter of the vessel 12 to allow for easy user grasping and manipulation. The top plate 36 includes a plurality of cylindrical recesses 34 aligned with corresponding recesses in the base plate 32. The recesses 34 in the top plate 36, however, have a diameter that is larger than the outer diameter knurled edge 58 of the cap 14*a*. This allows the caps 14*a* for the vessels 12 to be inserted within the recesses 34 of the top plate 36.

To assemble the sample holder 30, a plurality of vessels 12 are press-fit within the recesses 34 of the base plate 32. The vessels 12 are then loaded with at least one ball (not shown) and a material to be ground or mixed (also not shown). A cap 14*a* is then used to enclose the open end on each of the vessels 12. The top plate is then placed over the plurality of vessels 12 with the caps 14*a* being inserted into the recesses 34. Once assembled and loaded in the manner described above, the sample holder 30 is then attached to the vessel support platform/carriage 28/40 (see, FIGS. 1 and 2) with an orientation such that an axis of the vessel is aligned with the direction of reciprocal actuation. The drive mechanism 20 is then actuated to induce a reciprocating motion of the sample holders (and the contained vessels 12 therein) in an axial direction substantially oriented with the axis of each vessel. The ball (or balls) within each capped vessel 12 move back and forth with each reciprocation of the sample holder to grind or mix the included material. The spherical surfaces present at each end of the capped vessel 12 enhance the grinding and mixing effect by providing a complementary (i.e., similarly shaped) curved surface to that presented by the grinding media of the ball(s).

Figure 5B:
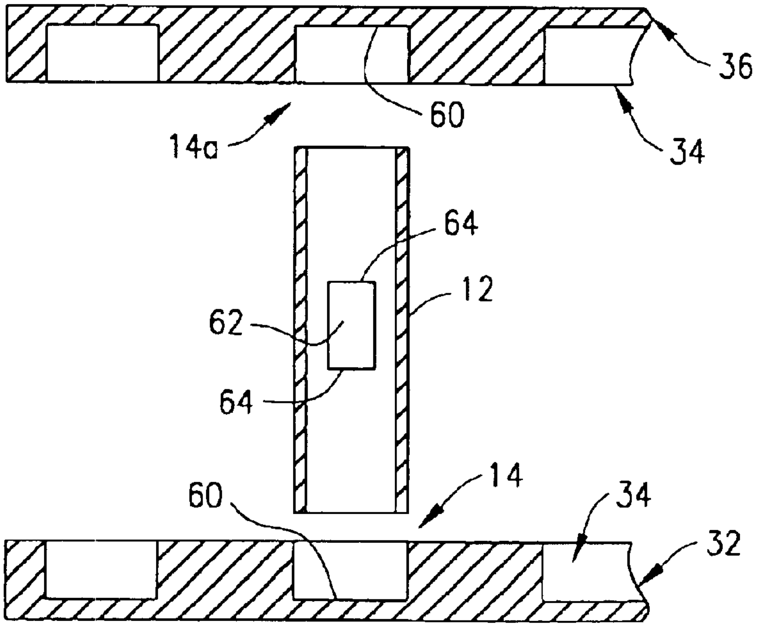

Turning next to FIG. 5B, the vessel 12 comprises a cylindrical tube that is open at both ends and is inserted into corresponding recesses 34 in the base plate 32 and top plate 36. The plates 32 and 36 in this configuration thus function not only to support and hold the vessels 12, but also serve as caps 14/14*a* for each end of the vessels. Given the flat, internal end surfaces 60 for the capped vessels 12, the use of a single ball would not likely provide maximum grinding or mixing efficiency (due to a lack of a complementary surface). Instead, multiple balls (of the same size or differing size) may be used (see, FIG. 4). Alternatively, a cylindrical slug 62 may be implemented as its flat ends 64 complement the surfaces 60. The slug 62 would preferably have an outer diameter that is smaller than the inner diameter of the cylindrical tube for each vessel 12.

Figure 5C:
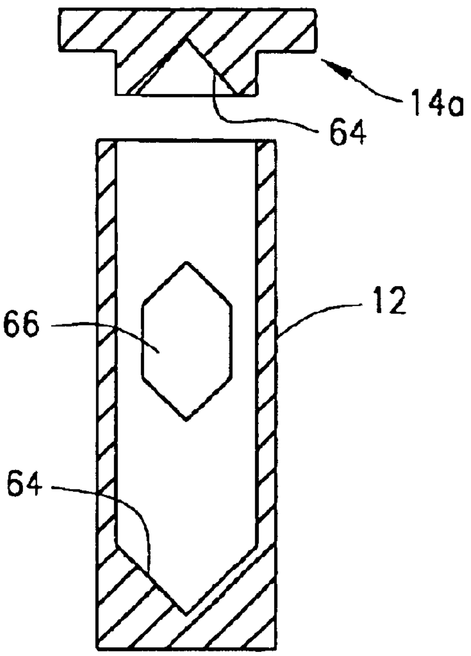

In FIG. 5C, it is illustrated that the end surfaces of the capped vessels 12 may take on shapes other than flat or spherical. As an example, a conical shape maybe used for the end surfaces 64 of the axial bore 50 and cap 14*a* insert portion 54. In this configuration, multiple balls (same size or difference sizes) may be used as the grinding media (as shown in FIG. 4), or a dual end tapered cylindrical slug 66 (as shown) may be used.

Figure 5D:
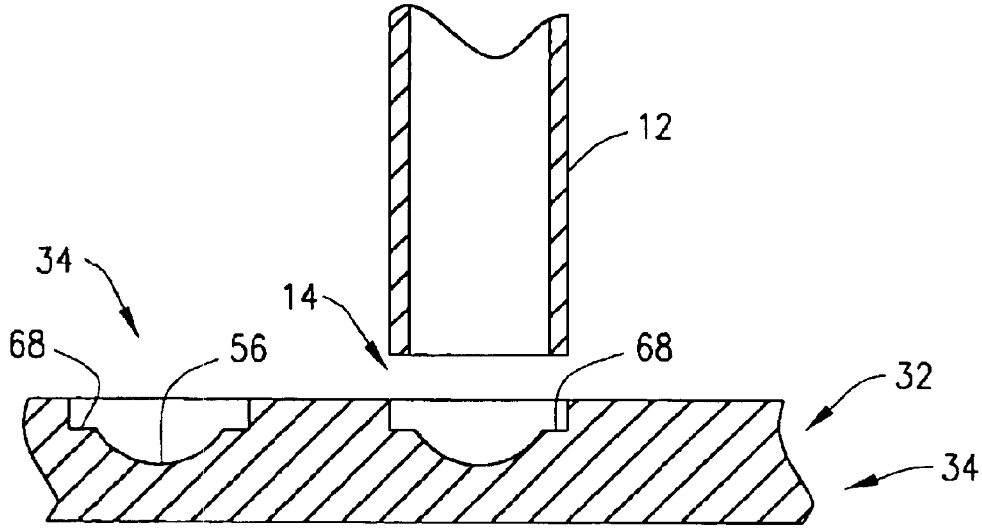

In FIG. 5D, the recesses 34 in the base plate 32 and top plate 36 are formed to possess a desired end surface shape that is complementary to the grinding media used with the vessel 12. For example, as shown, the recesses 34 are formed with a spherical surface recess 56 (not necessarily fully hemispherical) whose radius is greater than the radius of the ball used within the capped vessel as the grinding media. A conical surface could alternatively be chosen. In this configuration, the recess 34 includes a ledge 68 upon which the edge of the open end of the vessel 12 may rest when press-fit within the recess.

Figure 6:
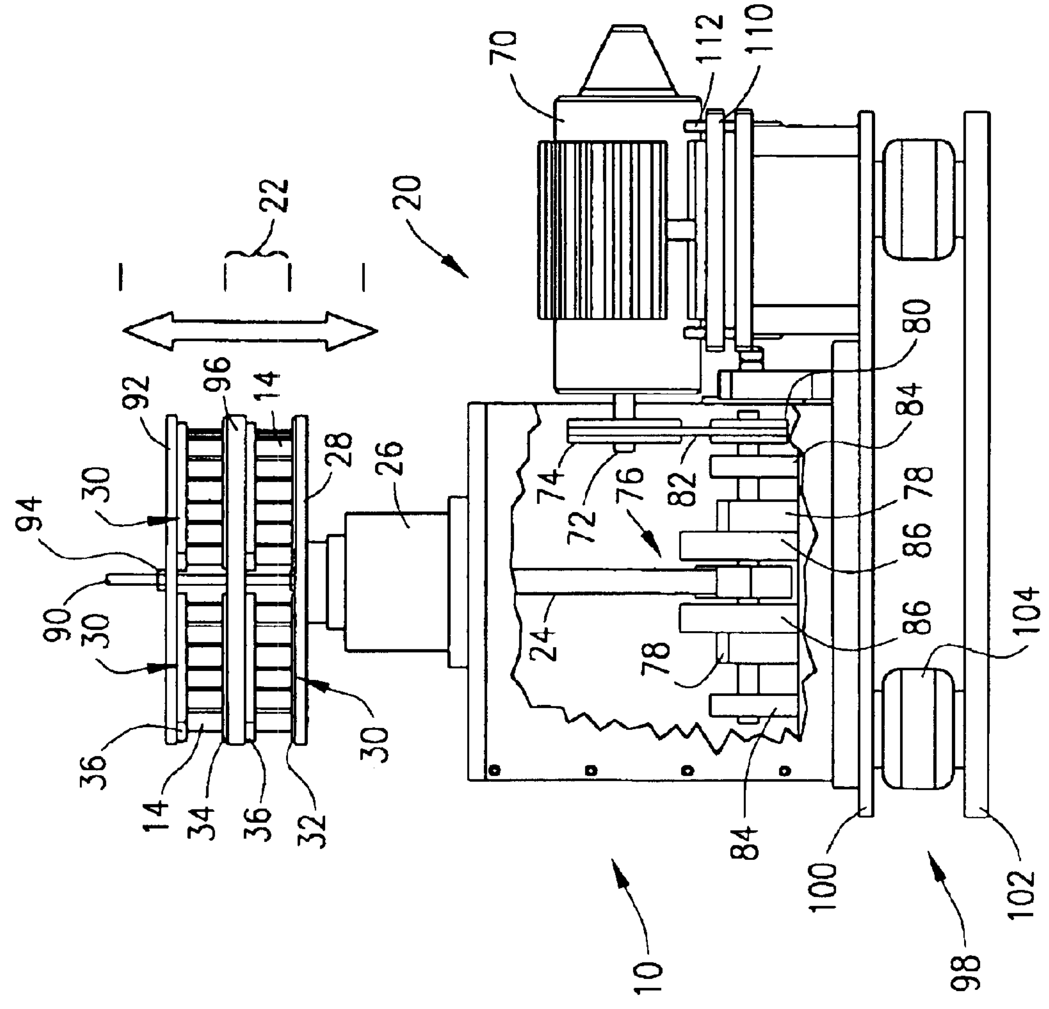
FIG. 6 is a partially broken away side view of the axially reciprocating tubular ball mill in accordance with the present invention.

Reference is now made to FIG. 6 wherein there is shown a partially broken away side view of the axially reciprocating tubular ball mill in accordance with the present invention. Although FIG. 6 illustrates the vertical orientation embodiment of the ball mill (see, FIG. 1), it will be understood that a same or similar configuration may be used in a horizontal orientation (see, FIG. 2). The drive mechanism 20 comprises a motor 70 with a drive shaft 72. The motor may comprise a three-phase 220 Volt AC motor of common design. The remainder of the drive mechanism is installed within an enclosure to protect the user from injury. Mounted to the drive shaft is a first pulley 74. A balanced crankshaft 76 is horizontally mounted between a set of bearings 78 (for example, journal bearings). A second pulley 80 is mounted to the crankshaft 76 and connected for rotation to the first pulley 74 by a flexible drive member 82 such as a belt (and more particularly, a toothed belt). One or more flywheels 84 may also be mounted to the crankshaft 76. An offset pin mounted between the crankshaft counterweights 86 is connected to the drive rod 24 to convert the rotational movement of the crankshaft into linear reciprocation.

Figure 7:
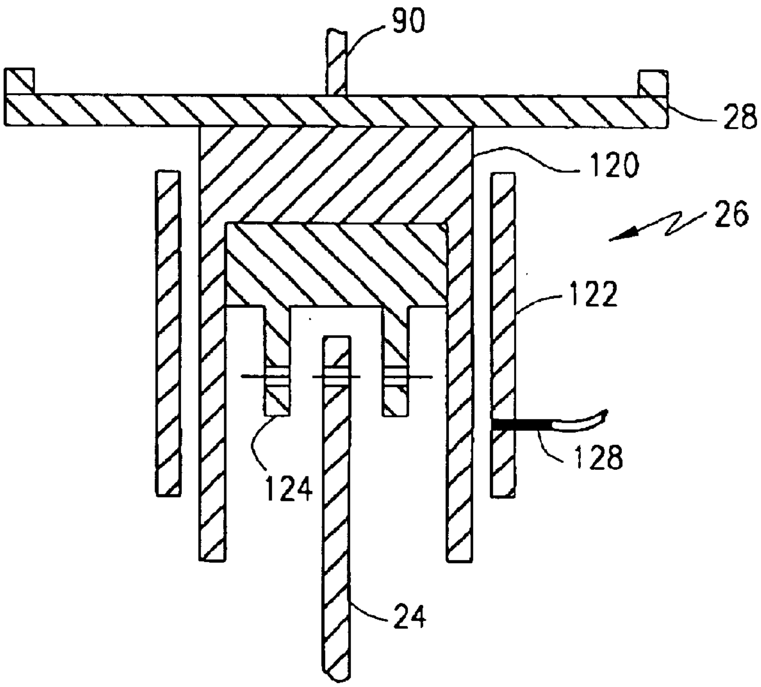
FIG. 7 is a cross-sectional side view of an air bearing utilized in the axially reciprocating tubular ball mill in accordance with the present invention.

At an opposite end of the drive rod 24 from the crankshaft, the rod is connected to the vessel support platform 28 through an air bearing 26. The air bearing includes a piston 120 (see, FIG. 7) that moves within a cylinder 122. The space between the piston 120 and cylinder 122 is pressurized with air. One end of the piston is connected to the drive rod 24 using a wrist pin 124 and the other end connected to the vessel support platform 28. The air bearing 26 provides a minimized friction surface for the piston 120 to move against, and thus accommodates the reciprocating speeds associated with operation of the ball mill 10. The minimized friction surface of the air bearing 26 is accomplished through the provision of a micro-layer of air between the outside surface of the piston 120 and the inside surface of the cylinder 122. The cylinder 122 for the air bearing 26 includes an electrical air pressure switch 128 that is used for monitoring air pressure within the bearing during ball mill operation. To the extent this switch 128 detects insufficient air pressure in the bearing during ball mill operation, the ball mill is automatically shut down. The switch 128 further must detect sufficient air pressure before the ball mill may be activated. Air pressure for the air bearing may be supplied from either house air or an air tank/air compressor.

Mounted substantially perpendicular to the surface of the platform 28 (in the direction of axial reciprocation) is a rod 90. One or more capped vessels 12 may be placed on the vessel support platform 28 around the rod 90. The vessel support platform 28 is preferably a rectangular metal (perhaps, aluminum) tray having depressions for receiving individual capped vessels 12 or sample holders 30. These capped vessels 12 are oriented in a manner such that the axis of each vessel is aligned substantially parallel to the direction of the induced linear reciprocation. To the extent that sample holders 30 are used (see, FIG. 3), they are placed on the platform 28 around the rod 90 to similarly orient the included vessels in substantial alignment with axial reciprocation. A pressure plate 92 is then placed over the rod 90 and on top of the capped vessels 12 (and sample holders 30). This pressure plate is similarly a rectangular metal tray having depressions for receiving capped vessels 12 or sample holders 30. A fastener 94 is then installed on the rod 90 against the pressure plate 92 to pinch the capped vessels 12 (and sample holders 30) between the pressure plate and the support platform 28. The fastener may comprise a nut, pin, or other specialty fastener. This pinching action retains the vessels and included sample holders 30 to the ball mill during operation. In the event multiple layers of capped vessels 12 (and sample holders 30) are desired, a spacer plate 96 may be placed over the threaded rod 90 between each of the included layers, with the pressure plate 92 installed and fastened on top. This spacer plate is similarly a rectangular tray having depressions on both sides for receiving capped vessels 12 or sample holders 30.

The ball mill 10 is mounted to a dampener base 98 that serves the function of isolating the reciprocating forces involved with the movement of the capped vessel 12 mass at high rates. To that end, the dampener base 98 dampens the vibration and frequency components of those forces. The base 98 includes a top plate 100 and a bottom plate 102. The plates 100 and 102 are separated from each other by a plurality of cushions 104 (perhaps comprising air balloons) These cushions are useful in adjusting the damping coefficients of the system. The bottom plate 102 is preferably thicker and heavier than the top plate 100, and is semi-permanently mounted to a floor or other reinforced structure. The heavier bottom plate 102 provides lateral and axial stability that inhibits movement of the ball mill during use.

The motor 70 is mounted to an adjustable mounting plate 110. The vertical position of the adjustable mounting plate 110, and hence the vertical position of the motor 70, may be adjusted using a adjustment mechanism 112 comprising a screw-type adjustor of known design.

The control system for the ball mill 10 comprises a three-phase inverter that performs the necessary power conversion from the 220 Volt line input. A control box performs monitoring with respect to grinding operations. The control box contains a period timer that allows a user to set the duration of the grinding operation. The set time may be measured from tenths of seconds to hours, and ball mill will automatically shut off when the timer expires. The control box further includes a speed measurement and display circuit that presents to the user the operational speed of the ball mill. The control box further receives an input from the electrical air pressure switch 128 of the air bearing 26, and responds thereto by preventing start-up of the ball mill in the absence of sufficient air pressure and further shutting down the ball mill if the air pressure in the bearing drops below an acceptable level. User controls on the control box allow for the exercise of control over start, stop and speed of ball mill operation.

The vessels 12, caps 14/14*a* and plates 32/36 may be made of any suitable rigid material. As an example, a metal, such as stainless steel may be used. In a preferred embodiment, these components are manufactured from a synthetic material, more specifically an engineered plastic, and even more specifically Dupont Delrin ®. The balls or slugs used within the capped vessels 12 as grinding media are preferably made of stainless steel, although other materials, both metallic and synthetic, having sufficient mass may be alternatively used.

Figure 8:
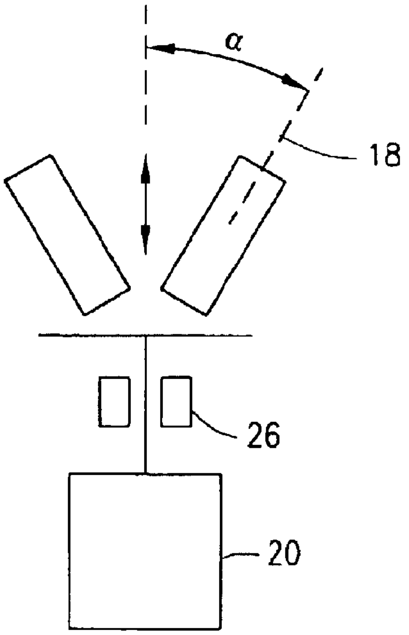
FIG. 8 is a schematic drawing of an alternative embodiment of an axially reciprocating tubular ball mill in accordance with the present invention.

Reference is now made to FIG. 8 wherein there is shown a schematic drawing of an alternative embodiment of an axially reciprocating tubular ball mill in accordance with the present invention. In FIGS. 1, 2 and 6, the directional axis (defined by the arrow) along which the drive mechanism induces reciprocation is substantially parallel with the longitudinal axis 18 (and in the case of a single vessel the axes may be substantially aligned therewith). In an alternate configuration, the longitudinal axis for each included vessel 12 may be offset from the directional axis of induced linear reciprocation by a selected acute angle $\alpha$. This acute angle offset may provide for a better grinding or mixing of certain materials and further counteract the effects of material agglomeration.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A ball mill, comprising:

a tubular vessel for containing grinding media and a material to be ground, the tubular vessel having an axis;

a drive mechanism including a drive rod that induces a linear reciprocating movement of the tubular vessel substantially along the axis of the vessel to grind the contained material by moving the grinding media back and forth within the tubular vessel; and an air bearing supporting substantially frictionless reciprocating movement of the drive rod.

2. The ball mill as in claim 1 wherein the linear reciprocating movement occurs at a rate in excess of 1000 cycles per second.

3. The ball mill as in claim 1 wherein the linear reciprocating movement produces a stroke distance in excess of 1 inch.

4. The ball mill as in claim 1 wherein the axis of the tubular vessel is substantially vertically oriented.

5. The ball mill as in claim 1 wherein the axis of the tubular vessel is substantially horizontally oriented.

6. The bail mill as in claim 1 wherein the grinding media comprises a single ball having a diameter that is less than an inner diameter of the tubular vessel.

7. The ball mill as in claim 6 wherein ends of the tubular vessel are defined by a spherical surface conforming to the inner diameter of the tubular vessel.

8. The ball mill as in claim 7 wherein the spherical surface is hemispherical.

9. The ball mill as in claim 1 wherein the grinding media comprises a plurality of balls.

10. The ball mill as in claim 9 wherein the plurality of balls are of differing sizes.

11. The ball mill as in claim 1 wherein the grinding media comprises a single cylindrical slug having a diameter that is less than an inner diameter of the tubular vessel.

12. The ball mill as in claim 11 wherein ends of the tubular vessel are defined by a flat surface.

13. The ball mill as in claim 11 wherein ends of the tubular vessel are defined by a conical surface.

14. The ball mill as in claim 1 further including:

platform supporting the tubular vessel; and the drive rod passing through the air bearing and transferring the induced linear reciprocating movement to the platform supporting the tubular vessel.

15. The ball mill as in claim 1 wherein the axis of the tubular vessel is offset from a direction of the induced linear reciprocation by an acute angle.

16. A ball mill, comprising:

a sample holder comprised of a plurality of vessels, each vessel having a tubular configuration and a longitudinal axis about which an interior for performing ball grinding is defined; and means for reciprocating a drive rod coupled to the sample holder in a substantially frictionless manner and in a direction substantially parallel to axes of the plurality of vessels within the same holder.

17. The ball mill as in claim 16 wherein the means for reciprocating comprises a vertically reciprocating drive mechanism having the drive rod which induces reciprocating movement of the sample holder substantially along the longitudinal axes of the vessels.

18. The ball mill as in claim 16 wherein the means for reciprocating comprises an air bearing supporting substantially frictionless movement of the drive rod.

19. The ball mill as in claim 16, wherein the means for reciprocating comprises an air bearing supporting substantially frictionless movement of the drive rod.

20. The ball mill as in claim 16 wherein the means for reciprocating comprises a horizontally reciprocating drive mechanism having the drive rod which induces reciprocating movement of the sample holder substantially along the longitudinal axes of the vessels.

21. The ball mill as in claim 16 further including a dampening base.

22. A ball mill grinding method, comprising the steps of:

loading a vessel with a grinding media and a material to be ground, the vessel having a longitudinal axis;

capping the vessel to contain the grinding media and material; and reciprocating a shaft of a drive mechanism coupled to the capped vessel containing the grinding media and material to be ground in a substantially frictionless manner and in a direction substantially along the longitudinal axis.

23. The ball mill grinding method as in claim 22 wherein the step of reciprocating comprises the step of reciprocating with a vertical orientation.

24. The ball mill grinding method as in claim 22 wherein the step of reciprocating comprises the step of reciprocating with a horizontal orientation.

25. The ball mill grinding method as in claim 22 wherein the step of loading comprises the step of loading a single ball within the vessel.

26. The ball mill grinding method as in claim 22 wherein the step of loading comprises the step of loading a plurality of balls within the vessel.

27. The ball mill grinding method as in claim 26 wherein the plurality of balls are of differing sizes.

28. The ball mill grinding method as in claim 22 wherein the step of loading comprises the step of loading a single cylindrical slug within the vessel.

* * * * *